(12) United States Patent
Beers et al.

(10) Patent No.: US 11,300,139 B2
(45) Date of Patent: Apr. 12, 2022

(54) AIR CYCLE MACHINE WITH COOLING AIR FLOW PATH

(71) Applicant: Hamilton Sundstrand Corporation, Charlotte, NC (US)

(72) Inventors: Craig M. Beers, Wethersfield, CT (US); Darryl A. Colson, West Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 184 days.

(21) Appl. No.: 16/707,422

(22) Filed: Dec. 9, 2019

(65) Prior Publication Data
US 2021/0172338 A1   Jun. 10, 2021

(51) Int. Cl.
| | |
|---|---|
| F04D 29/58 | (2006.01) |
| B64D 13/08 | (2006.01) |
| F04D 25/04 | (2006.01) |
| F01D 25/12 | (2006.01) |
| F04D 29/056 | (2006.01) |

(52) U.S. Cl.
CPC .......... *F04D 29/584* (2013.01); *B64D 13/08* (2013.01); *F04D 25/04* (2013.01); *F01D 25/125* (2013.01); *F04D 29/056* (2013.01)

(58) Field of Classification Search
CPC ....... B64D 13/08; F01D 25/125; F04D 25/04; F04D 29/056; F04D 29/584
See application file for complete search history.

(56) References Cited

U.S. PATENT DOCUMENTS

| | | | | |
|---|---|---|---|---|
| 3,428,242 | A * | 2/1969 | Rannenberg | F02C 6/06 415/180 |
| 5,113,670 | A * | 5/1992 | McAuliffe | F16C 17/26 62/402 |
| 5,309,735 | A | 5/1994 | Maher, Jr. et al. | |
| 7,402,020 | B2 * | 7/2008 | Beers | F04D 29/584 415/1 |
| 8,734,017 | B1 * | 5/2014 | Colson | F16C 17/02 384/107 |
| 9,488,104 | B2 * | 11/2016 | Junod | F01D 25/08 |
| 9,784,126 | B2 * | 10/2017 | Army | F16C 17/243 |
| 9,863,430 | B2 * | 1/2018 | Lee | F04D 25/082 |
| 10,160,546 | B2 | 12/2018 | Beers et al. | |

(Continued)

OTHER PUBLICATIONS

Extended European Search Report; International Application No. 20209606.1-1007; International Filing Date: Nov. 24, 2020; dated Apr. 12, 2021; 27 pages.

*Primary Examiner* — Jesse S Bogue
(74) *Attorney, Agent, or Firm* — Cantor Colburn LLP

(57) ABSTRACT

An air cycle machine is provided including a plurality of components operably coupled via a shaft, the shaft being rotatable about an axis. A cooling airflow path receives cooling air from a cooling air source, directs the cooling air to at least one air-cooled bearing associated with one of the plurality of components, and discharges the cooling air. A cooling conduit is arranged in fluid communication with the cooling airflow path, wherein cooling air provided to the cooling conduit from the cooling airflow path has a first temperature and cooling air returned to the cooling airflow path has a second temperature, the second temperature being less than the first temperature.

14 Claims, 2 Drawing Sheets

(56) References Cited

U.S. PATENT DOCUMENTS

| | | | |
|---|---|---|---|
| 2011/0229351 A1* | 9/2011 | Beers | B64D 13/06 |
| | | | 417/372 |
| 2016/0272329 A1 | 9/2016 | Beers et al. | |
| 2017/0102002 A1* | 4/2017 | Beers | F01D 25/22 |
| 2017/0167541 A1 | 6/2017 | Army et al. | |

* cited by examiner

AIR CYCLE MACHINE WITH COOLING AIR FLOW PATH

BACKGROUND

The subject matter disclosed herein relates to an air cycle machine of an environmental control system and, more particularly, to a cooling air supply for an air cycle machine.

Existing aircraft environmental control systems (ECS) incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels may include, for example, a compressor rotor, a turbine rotor, a fan rotor, an additional turbine rotor, or an additional compressor rotor. In some cases the turbine or turbines drive both the compressor and the fan.

Hydrodynamic fluid film journal bearings, also called journal air bearings or foil bearings, can be used to provide support to rotatable components such as shafts. A typical journal bearing may include a journal sleeve, a bump foil, an intermediate foil, and a top foil. During operation, rotation of the rotatable component causes a working fluid to form a cushion (often referred to as an "air bearing") that supports the rotatable component with little or no direct contact between the rotatable component and the foils of the bearing. Journal bearings provide fluid cushions for radial loads. Similarly, hydrodynamic fluid film thrust bearings generate a lubricating nonlinear air film between a portion of a rotating shaft or other rotatable component and the bearing. One typical bearing arrangement utilizes a top subassembly including an annular main plate having multiple arcuate, corrugated foils welded to the main plate. A bottom subassembly includes another annular main plate having multiple arcuate bump foils welded to the main plate. Daring operation, rotation of the rotatable component or shaft causes a working fluid to form in and around the corrugated foils to provide an air bearing. The bump foils provide a desired spring rate to cushion the rotatable component as the shaft moves axially. Thus, thrust hearings provide fluid cushions for axial loads.

During operation, the bearings may be rotated at speeds that result in heat generation. The heat can lead to failure of the bearings by compromising the structural integrity of the components of the bearings. To reduce the risk of failure of the bearings, cooling air is conveyed and passed over bearing surfaces to remove the heat from the bearing. The bearing cooling airflow is supplied from a single source. In some embodiments, such as when, such as the bleed air inlet of the air conditioning system.

BRIEF DESCRIPTION

According to one embodiment, an air cycle machine is provided including a plurality of components operably coupled via a shaft, the shaft being rotatable about an axis. A cooling airflow path receives cooling air from a cooling air source, directs the cooling air to at least one air-cooled bearing associated with one of the plurality of components, and discharges the cooling air. A cooling conduit is arranged in fluid communication with the cooling airflow path, wherein cooling air provided to the cooling conduit from the cooling airflow path has a first temperature and cooling air returned to the cooling airflow path has a second temperature, the second temperature being less than the first temperature.

In addition to one or more of the features described above, or as an alternative, in further embodiments the cooling air returned to the cooling airflow path from the cooling conduit has a temperature of less than 300° F.

In addition to one or more of the features described above, or as an alternative, in further embodiments the cooling air returned to the cooling airflow path from the cooling conduit has a temperature of less than 250° F.

In addition to one or more of the features described above, or as an alternative, in further embodiments the air cycle machine includes a housing and the cooling conduit is located within an interior of the housing.

In addition to one or more of the features described above, or as an alternative, in further embodiments the cooling conduit is arranged in a heat transfer relationship with one of the plurality of components.

In addition to one or more of the features described above, or as an alternative, in further embodiments the plurality of components includes a turbine and heat from the cooling air within the cooling conduit is transferred to the turbine.

In addition to one or more of the features described above, or as an alternative, in further embodiments the cooling air is cooled by a fluid arranged at an outlet of the turbine.

In addition to one or more of the features described above, or as an alternative, in further embodiments the cooling conduit is positioned adjacent an exterior of an outlet duct of the turbine.

In addition to one or more of the features described above, or as an alternative, in further embodiments the cooling conduit wraps at least 360 degrees about the exterior of the outlet duct of the turbine.

In addition to one or more of the features described above, or as an alternative, in further embodiments the cooling conduit is positioned within an interior of an outlet duct of the turbine.

In addition to one or more of the features described above, or as an alternative, in further embodiments a flow path defined by the cooling conduit includes a plurality of passes of the cooling air relative to the turbine.

According to another embodiment, a method of cooling a bearing of an air cycle machine includes delivering air from a cooling air source to a cooling air flow path within the air cycle machine, reducing a temperature of at least a portion of the cooling air, and supplying the at least a portion of the cooling air to one or more bearings within the air cycle machine.

In addition to one or more of the features described above, or as an alternative, in further embodiments reducing the temperature of at least a portion of the cooling air includes reducing the temperature to less than 300° F.

In addition to one or more of the features described above, or as an alternative, in further embodiments reducing the temperature of at least a portion of the cooling air includes reducing the temperature to less than 250° F.

In addition to one or more of the features described above, or as an alternative, in further embodiments reducing the temperature of at least a portion of the cooling air further comprises directing the at least a portion of the cooling air into a cooling conduit fluidly coupled to the cooling airflow path and transferring heat from the at least a portion of the cooling air in the cooling conduit to another component within the air cycle machine.

In addition to one or more of the features described above, or as an alternative, in further embodiments transferring heat from the at least a portion of the cooling air in the cooling conduit to another component within the air cycle machine further comprises transferring heat from the at least a portion of the cooling air in the cooling conduit to a turbine of the air cycle machine.

In addition to one or more of the features described above, or as an alternative, in further embodiments the at least a portion of the cooling air in the cooling conduit transfers heat to a fluid arranged at an outlet of the turbine.

In addition to one or more of the features described above, or as an alternative, in further embodiments the cooling conduit is wrapped about a periphery of an outlet duct of the turbine.

In addition to one or more of the features described above, or as an alternative, in further embodiments the cooling conduit is arranged within an interior of an outlet duct of the turbine.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Figure 1:
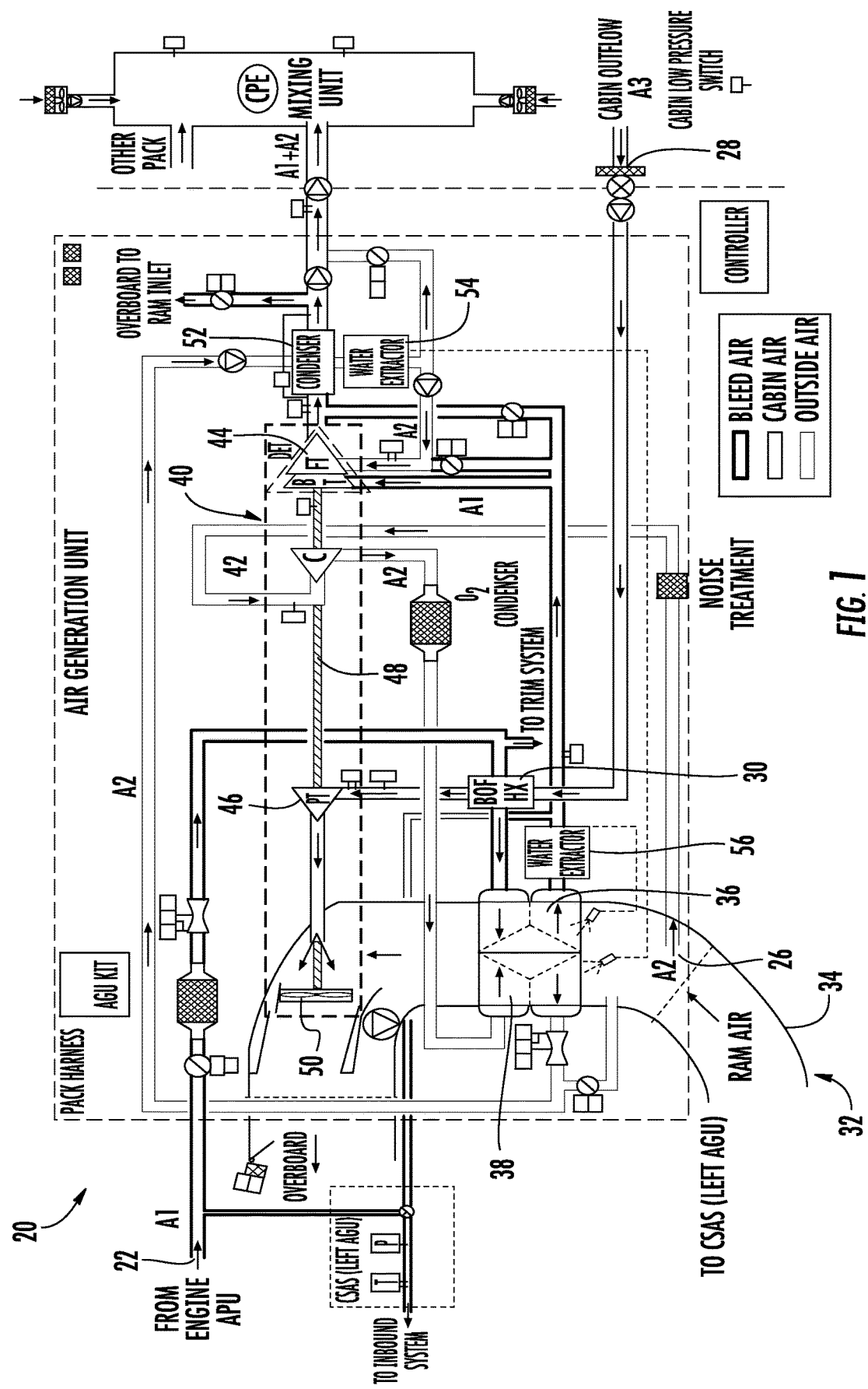
FIG. 1 depicts a schematic of an environmental control system of an aircraft according to an embodiment.

With reference now to FIG. 1, a schematic diagram of an example of an environmental control system (ECS) 20 is depicted according to a non-limiting embodiment. Although the environmental control system 20 is described with reference to an aircraft, alternative applications are also within the scope of the disclosure. As shown in the FIG., the ECS 20 can receive a first medium A1 at an inlet 22 and provide a conditioned form of the first medium A1 to a volume 24. In embodiments where the ECS 20 is used in an aircraft application, the first medium A1 is bleed air, which is pressurized air originating from i.e. being "bled" from, an engine or auxiliary power unit of the aircraft. It shall be understood that or more of the temperature, humidity, and pressure of the bleed air can vary based upon a compressor stage and revolutions per minute of the engine.

The ECS 20 receives a second medium A2 at an inlet 26. In an embodiment, the second medium A2 is fresh air, such as outside air for example. The outside air can be procured via one or more scooping mechanisms, such as an impact scoop or a flush scoop for example. Thus, the inlet 26 can be considered a fresh or outside air inlet. Generally, the fresh air A2 described herein is at an ambient pressure equal to an air pressure outside of the aircraft when the aircraft is on the ground, and is between an ambient pressure and a cabin pressure when the aircraft is in flight.

The ECS 20 can further receive a third medium A3 from the volume 24. In one embodiment the volume 24 is the cabin of an aircraft, and the third medium A3 is cabin discharge air, which is air leaving the volume 24 that would typically be discharged overboard. For example, the cabin discharge air can be supplied to a destination, such as an outlet 28. In the illustrated, non-limiting embodiment, the outlet 28 is arranged in fluid communication with an outflow heat exchanger 30. In some embodiments, the ECS 20 is configured to extract work from the third medium A3. In this manner, the pressurized air of the volume 24 can be utilized by the ECS 20 to achieve certain operations.

The ECS 20 includes a ram air circuit 32 including a shell or duct, illustrated at 34, within which one or more heat exchangers are located. The shell 34 can receive and direct a medium, such as ram air for example, through a portion of the ECS 20. The one or more heat exchangers are devices built for efficient heat transfer from one medium to another. In an embodiment, the one or more heat exchangers may be separate heat exchangers positioned generally adjacent one another, or coupled to one another, within the shell 34. Alternatively, the one or more heat exchangers may include a single heat exchanger body having distinct portions, each of which is configured to receive a separate fluid and function as a separate heat exchanger within the unitary body. Examples of the type of heat exchangers that may be used, include, but are not limited to, double pipe, shell and tube, plate, plate and shell, adiabatic shell, plate fin, pillow plate, and fluid heat exchangers The one or more heat exchangers arranged within the shell 34 may be referred to as ram heat exchangers. In the illustrated, non-limiting embodiment, the ram heat exchangers include a first heat exchanger 36 and a second heat exchanger 38. Within the heat exchangers 36, 38 ram air, such as outside air for example, acts as a heat sink to cool a medium passing there through, for example the first medium A1 and/or the second medium A2. Although the ram air is configured to flow over the first and second heat exchangers 36, 38 simultaneously in the illustrated embodiment, other embodiments where the ram air is configured to flow over the heat exchangers sequentially is also within the scope of the disclosure.

The ECS 20 additionally comprises at least one compressing device 40. In the illustrated, non-limiting embodiment, the compressing device 40 of the ECS 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compressing device 40 include an air cycle machine, such as a three-wheel air cycle machine, a four-wheel air cycle machine, etc.

As shown, the compressing device 40 includes a compressor 42, a turbine 44, and a power turbine 46 operably coupled to each other via a shaft 48. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The turbine 44 and the power turbine 46 are mechanical devices that expand a medium and extract work therefrom (also referred to as extracting energy). In the compressing device 40, the turbines 44, 46 drive the compressor 42 via the shaft 48. In an embodiment, a fan 50, such as located within the ram air circuit 32, may also be part of the compressing device 40 and driven via rotation of the shaft 48.

In an embodiment, at least one of the turbines, for example turbine 44, is a dual use and/or a dual entry turbine.

A dual use turbine is configured to receive flows of different mediums in the alternative. A dual entry turbine is configured with multiple nozzles that can receive flows of mediums at different entry points, such that multiple flows can be received simultaneously. For example, the turbine 44 can include a plurality of inlet gas flow paths, such as an inner flow path and an outer flow path, to enable mixing of alternative medium flows at the exit of the turbine 44. The inner flow path can be a first diameter, and the outer flow path can be a second diameter. The inner flow path can align with one of the first or second nozzles, and the outer flow path can align with the other of the first or second nozzles.

The ECS 20 additionally includes at least one dehumidification system. In the illustrated, non-limiting embodiment, the dehumidification system includes a condenser 52 and a water collector 54. The condenser 52 is a particular type of heat exchanger and the water collector 54 is a mechanical device that performs a process of removing water from a medium.

The elements of the ECS 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the ECS 20. Valves can be operated by actuators, such that flow rates of the medium in any portion of the ECS 20 can be regulated to a desired value.

In at least one mode of operation of the ECS 20, high-pressure high-temperature air provided from a bleed air source via inlet 22 enters the first or primary heat exchanger 36. The primary heat exchanger 36 cools the pressure high-temperature air to nearly ambient temperature to produce cool high pressure air. Upon exiting the primary heat exchanger 36, condensed moisture may be removed from the air via a water collector 54, and the air may be provided to the turbine 44.

In the illustrated, non-limiting embodiment, the cool high pressure air enters the turbine 44 through a nozzle (e.g., a first nozzle). The cool high pressure air is expanded across the turbine 44 and work extracted from the cool high pressure air. This extracted work drives the compressor 42 used to compress fresh outside air. This extracted work also drives the fan 50, which is used to move air through the primary heat exchanger 36 and the secondary heat exchanger 38.

At the same time, a flow of fresh, outside air is provided to the ECS 20 via inlet 26 and directed to the compressor. The act of compressing the fresh outside air, heats the fresh outside air. The compressed fresh outside cooled within the secondary heat exchanger 38, such as to nearly ambient temperature. The air exiting the secondary heat exchanger 38 then enters the condenser 52, where moisture within the air is condenser to a liquid, and the water collector 54, where the condensed free moisture is removed, to produce a cool medium pressure air. This cool medium pressure air then enters the turbine 44 through a nozzle (e.g., a second nozzle). The cool medium pressure air is expanded across the turbine 44 and work is extracted from the cool medium pressure air.

The two air flows (e.g., the fresh outside air A2 and the bleed air A1 are mixed at an exit of the turbine 44 to produce mixed air. The exit of the turbine 44 can be considered a first mixing point of the ECS 20. The mixed air leaves the turbine 44 and enters the condenser 52 to cool the bleed air leaving the secondary heat exchanger 38. The mixed air is then sent to one or more loads, such as to condition the volume 24. It should be understood that the environmental control system illustrated and described herein is intended as an example only and that an environmental control system having another configuration is also contemplated herein.

Figure 2:
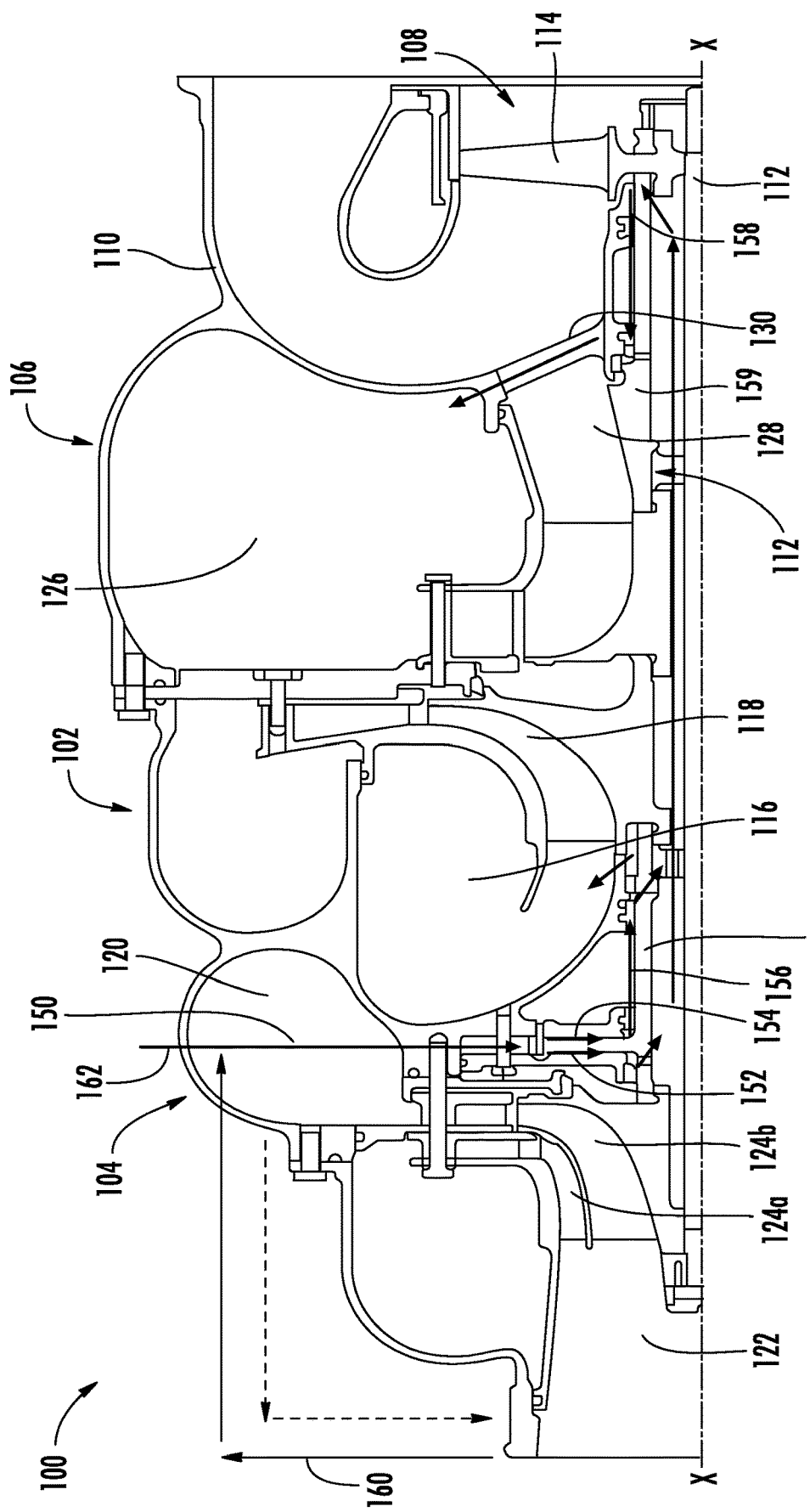
FIG. 2 is a cross-sectional view of a compressing device of an environmental control system of an aircraft according to an embodiment.

With reference now to FIG. 2, a cross-sectional view of a portion of a compressing device 100, such as the compressing device 40 of the ECS 20 described above with respect to the FIG. 1, is shown. In the illustrated, non-limiting embodiment, the compressing device 100 is a four wheel four-wheel air cycle machine including a compressor 102, a first turbine 104, a second turbine 106, and a fan 108. As best shown in FIG. 2, the various components of the compressing device 100 may be disposed within a housing 110. Each of the compressor 102, first turbine 104, second turbine 106, and fan 108 is operably coupled via a shaft 112 rotatable about a central axis X. The shaft 112 may be a rod, such as a titanium tie-rod for example.

The fan 108 includes a plurality of fan blades 114 rotatable about the axis X defined by the shaft 112. The fan 108 is typically used to draw in air from an associated gas turbine engine or other aircraft component, or from an exterior of the aircraft. The compressor 102 includes a compressor outlet 116, and a compressor nozzle 118. The compressor outlet 116 is a duct through which air can be routed to other systems. The first turbine 104 includes a turbine inlet 120, a turbine outlet 122, and at least one turbine nozzle 124. The turbine inlet 120 is a duct through which air passes prior to expansion within the first turbine 104. The turbine outlet 122 is a duct through which air can be routed after it has been expanded to be used in other areas of the aircraft. For example, air can be routed out of the turbine outlet 122 and into a cabin for use as cabin air. The turbine nozzle 124 is a rotor or impeller that extracts energy from air passing through the first turbine. In the illustrated, non-limiting embodiment, the first turbine 104 is a dual entry turbine having two distinct nozzles 124a, 124b. However, embodiments where the first turbine 104 includes only a single nozzle are also within the scope of the disclosure.

Similarly, the second turbine 106 includes a turbine inlet 126, a turbine outlet 128, and a turbine nozzle 130. As previously noted, the turbine inlet 126 is a duct through which air passes prior to expansion in the second turbine and the turbine outlet 128 is a duct through which air can be routed after it has been expanded to be used in other areas of the aircraft. The turbine nozzle 130 is a rotor or impeller that extracts energy from air passing through the second turbine. The pressurized air passing through the second turbine 106 drives rotation of the second turbine 106 and any attached components including the shaft 112, fan 108, and compressor 102.

During operation of the compressing device 100, air is received in the compressor 102. The air can be ram air from a ram air scoop or the air can be pulled into the compressing device 100 via the fan 108 from an associated gas turbine or other aircraft component. The air passes through compressor 102 where it is compressed with compressor nozzle 118 and then discharged out of compressor outlet 116. From the compressor outlet 116, the air may then indirectly routed into the first turbine inlet 120. The air expands as it passes through first turbine 104 and rotates the turbine nozzle 124 before it is discharged out of turbine outlet 122. Air that is discharged out of turbine outlet 122 can then be routed to other parts of the aircraft, for example, for use as cabin air.

The plurality of wheels or rotors of the compressing device 100 are fixed together via the housing 110 and are supported by at least one bearing element. In the illustrated, non-limiting embodiment of FIG. 2, the compressing device 100 includes four bearings which are arranged along a cooling airflow path 150, represented by the path of arrows in FIG. 2. The airflow path provides air as both a lubricating fluid for the hydrodynamic bearings and as a cooling air flow to remove heat generated by the bearings during operation. Although described herein as a four-wheel air cycle machine, this is presented for illustrative and explanatory purposes, and other air cycle machines or other devices/configurations may be used without departing from the scope of the invention, such as, for example, a three-wheel air cycle machine.

In the embodiment of FIG. 2, the compressing device 100 includes at least one thrust bearing and at least one journal bearing. For example, the compressing device 100 may include two thrust bearings and two journal bearings. A first thrust bearing 152 is configured as an outboard thrust bearing and a second thrust bearing 154 is configured as an inboard thrust bearing. After the thrust bearings 152, 154, in the direction of the cooling airflow path 150, a first journal bearing 156 is configured as a turbine journal bearing and a second journal bearing 158 is configured as a fan journal bearing. The thrust bearings 152, 154 are configured to operate with axial loads, and the journal bearings 156, 158 are configured to operate with radial loads. In the illustrated, non-limiting embodiment, the shaft 112 is actually defined by a plurality of shafts. For example, the thrust bearings 152, 154, and one of the first journal bearing 156 are configured to interface with a thrust shaft, illustrated at 157. Similarly, the second journal bearing 158 is configured to interface with a journal bearing shaft 159.

As a non-limiting example, the compressing device 100 may operate at 20,000-50,000 RPM. However, other rotational speeds of operation may be used without departing from the scope of the invention. As such, during operation, each of the bearings 152, 154, 156, 158 will generate heat due to viscous shear of the hydrodynamically generated film of air between the bearing top foil and the rotating shaft 112 which can lead to structural failure of the bearings. To dissipate the heat, the cooling air C flows along the cooling airflow path 150 and passes over the bearings 152, 154, 156, 158 to remove heat from the bearings. In an embodiment, the cooling air C flows through corrugations in the bearing bump foil (not shown). The cooling air C may then be directed into one of the components of the compressing device 100, such as the chamber of the second turbine 106 for example, from which the cooling air C is exhausted either overboard, or alternatively, into the ram air circuit.

To properly lubricate and cool the plurality of bearings 152, 154, 156, 158, the cooling air C travelling along cooling airflow path 150 should have a temperature of less than 300° F., and in some embodiments, less than 250° F. Pressurized bleed air is typically provided as the cooling air C operable to cool and lubricate the bearings; however, it should be understood that air from any suitable source is within the scope of the disclosure. In instances where bleed air functions as the cooling air C, because the bleed air is drawn in from the gas turbine engine or the auxiliary power unit having a high pressure and temperature, the temperature of the bleed air may be too warm to sufficiently cool the bearings. Accordingly, it may be desirable to reduce the temperature of the cooling air C prior to providing the cooling air C to the bearings 152, 154, 156, 158.

As shown in FIG. 2, a temperature of at least a portion of the cooling air C configured to lubricate and cool the bearings 152, 154, 156, 158 of the compressing device 100 may be reduced prior to supplying the cooling air C to one or more of the plurality of bearings 152, 154, 156, 158. In the illustrated, non-limiting embodiment, all or a portion of the cooling air C is arranged in a heat transfer relationship with another, colder medium, upstream from the plurality of bearings. As shown, at least a portion of the cooling air C within the cooling airflow path 150 is diverted into a cooling conduit 160 arranged in a heat transfer relationship with another portion of the compressing device 100, such as the outlet 122 of the first turbine 104. The cooling conduit 160 may be contained within the housing of the compressing device 100. As shown, the cooling conduit 160 is arranged adjacent an inlet or upstream end 162 of the cooling airflow path 150. However, embodiments where the cooling conduit 160 is arranged in fluid communication with the cooling airflow path 150 at a location further downstream, such as directly upstream from one of the plurality of bearings 152, 154, 156, 158 for example, is also contemplated herein.

In an embodiment, the cool air output from the first turbine 104 is used to reduce the temperature of the cooling air C within the cooling conduit 160. In such embodiments, the cooling conduit 160 may be mounted about the exterior of the turbine outlet 122, such as wrapped or coiled about the duct of the turbine outlet 122 for example. For example, the conduit 160 may wrap at least a full revolution or 360 degrees about the outlet duct. Alternatively, the cooling conduit 160 may extend through an interior of the duct of the turbine outlet 122. The total number of passes of the cooling air C relative to the medium output from the first turbine 104, such as defined by wraps or coils of the cooling conduit 160 relative to the duct of the turbine outlet 122, may be selected to achieve a desired amount of heat transfer and resulting temperature of the cooling airflow. Once a desired temperature of the cooling air C is achieved, the cooling air C is returned to the cooling airflow path 150 to lubricate and cool the bearings 152, 154, 156, 158. Although the cooling air C is shown as being retuned to the airflow path 150 upstream from the inlet of the cooling conduit 160, embodiments where the cooling air is returned to the to the cooling airflow path 150 downstream from the cooling conduit 160 are also contemplated herein. The cooling conduit 160 may be a separate component, such as a hose or tube for example, or alternatively, may be integral with the housing of the turbine 104, such as via a casting passage or duct for example, or some combination thereof.

By cooling the cooling flow C provided to the cooling airflow path 150, the lower temperature thereof will enable the use of existing foil bearings and coatings. Further, by arranging the cooling conduit 160 within the housing of the compressing device 100, potential for connection errors or contamination of the cooling airflow path 150 during maintenance is reduced or even eliminated.

What is claimed is:

1. An air cycle machine comprising:
a plurality of components operably coupled via a shaft, the shaft being rotatable about an axis;
a cooling airflow path that receives cooling air from a cooling air source located remotely from the air cycle machine, directs the cooling air to a plurality of air-cooled bearings associated with at least one of the plurality of components, and discharges the cooling air, the plurality of air-cooled bearing being arranged in series along the cooling airflow path; and
a cooling conduit in fluid communication with the cooling airflow path, wherein cooling air provided to the cooling conduit from the cooling airflow path has a first temperature and cooling air returned to the cooling airflow path has a second temperature, the second temperature being less than the first temperature; and
the air cycle machine includes a housing and the cooling conduit is located within an interior of the housing where the cooling conduit is arranged in a heat transfer relationship with one of the plurality of components; and the plurality of components includes a turbine and heat from the cooling air within the cooling conduit is transferred to the turbine.

2. The air cycle machine of claim 1, wherein the cooling air returned to the cooling airflow path from the cooling conduit has a temperature of less than 300° F.

3. The air cycle machine of claim 2, wherein the cooling air returned to the cooling airflow path from the cooling conduit has a temperature of less than 250° F.

4. The air cycle machine of claim 1, wherein the cooling air is cooled by a fluid arranged at an outlet of the turbine.

5. The air cycle machine of claim 1, wherein the cooling conduit is positioned adjacent an exterior of an outlet duct of the turbine.

6. The air cycle machine of claim 5, wherein the cooling conduit wraps at least 360 degrees about the exterior of the outlet duct of the turbine.

7. The air cycle machine of claim 4, wherein the cooling conduit is positioned within an interior of an outlet duct of the turbine.

8. The air cycle machine of claim 4, wherein a flow path defined by the cooling conduit includes a plurality of passes of the cooling air relative to the turbine.

9. A method of cooling a bearing of an air cycle machine comprising:

delivering air from a cooling air source to a cooling air flow path within the air cycle machine, the cooling air source being located remotely from the air cycle machine;

reducing a temperature of at least a portion of the cooling air; and supplying the at least a portion of the cooling air to a plurality of bearings within the air cycle machine, the plurality of bearing being arranged in series relative to the cooling air flow path; and reducing the temperature of at least a portion of the cooling air further comprises: directing the at least a portion of the cooling air into a cooling conduit fluidly coupled to the cooling airflow path; and transferring heat from the at least a portion of the cooling air in the cooling conduit to another component within the air cycle machine; wherein transferring heat from the at least a portion of the cooling air in the cooling conduit to another component within the air cycle machine further comprises transferring heat from the at least a portion of the cooling air in the cooling conduit to a turbine of the air cycle machine.

10. The method of claim 9, wherein reducing the temperature of at least a portion of the cooling air includes reducing the temperature to less than 300° F.

11. The method of claim 10, wherein reducing the temperature of at least a portion of the cooling air includes reducing the temperature to less than 250° F.

12. The method of claim 9, wherein the at least a portion of the cooling air in the cooling conduit transfers heat to a fluid arranged at an outlet of the turbine.

13. The method of claim 9, wherein the cooling conduit is wrapped about a periphery of an outlet duct of the turbine.

14. The method of claim 9, wherein the cooling conduit is arranged within an interior of an outlet duct of the turbine.

* * * * *